(12) United States Patent
Yoshizaki (10) Patent No.: US 10,711,687 B2
(45) Date of Patent: Jul. 14, 2020

(54) CONTROLLER AND CONTROL METHOD FOR WASTEGATE

(71) Applicant: TOYOTA JIDOSHA KABUSHIKI KAISHA, Toyota-shi (JP)

(72) Inventor: Satoshi Yoshizaki, Gotenba (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 5 days.

(21) Appl. No.: 16/151,952

(22) Filed: Oct. 4, 2018

(65) Prior Publication Data

US 2019/0162112 A1 May 30, 2019

(30) Foreign Application Priority Data

Nov. 29, 2017 (JP) ................. 2017-229583

(51) Int. Cl.
*F02B 37/18* (2006.01)
*F02B 37/00* (2006.01)
*F02D 41/06* (2006.01)
*F02D 41/00* (2006.01)
*F02D 23/00* (2006.01)
*F02B 37/16* (2006.01)

(52) U.S. Cl.
CPC ............ *F02B 37/18* (2013.01); *F02B 37/001* (2013.01); *F02B 37/002* (2013.01); *F02B 37/186* (2013.01); *F02D 23/00* (2013.01); *F02D 41/0007* (2013.01); *F02D 41/065* (2013.01); *F02B 37/16* (2013.01)

(58) Field of Classification Search
CPC ...... F02B 37/001; F02B 37/002; F02B 37/16; F02B 37/18; F02B 37/186; F02D 23/00; F02D 41/0007; F02D 41/065
See application file for complete search history.

(56) References Cited

U.S. PATENT DOCUMENTS

| 4,656,834 A * | 4/1987 | Elpern ................. F02B 37/183 251/68 |
| 8,297,054 B2 * | 10/2012 | Gladden ............... F02B 37/007 123/562 |
| 9,109,504 B2 * | 8/2015 | Wang .................. F02D 41/1401 |
| 9,243,553 B2 * | 1/2016 | Kokotovic ............. F02B 37/22 |

FOREIGN PATENT DOCUMENTS

| JP | 5-231165 A | 9/1993 |
| JP | 7-332136 | 12/1995 |
| JP | 2015-214935 | 12/2015 |

* cited by examiner

*Primary Examiner* — Jesse S Bogue
(74) *Attorney, Agent, or Firm* — Oblon, McClelland, Maier & Neustadt, L.L.P.

(57) ABSTRACT

A controller sets a target operation position and controls an operation position of a wastegate in accordance with the target operation position in a position control mode. The controller sets a target drive force and controls a drive force of the wastegate in accordance with the target drive force in a drive force control mode. The controller controls the wastegate in the position control mode when a boost pressure of an engine is less than or equal to a preset value and controls the wastegate in the drive force control mode when the boost pressure is greater than the preset value.

5 Claims, 4 Drawing Sheets

CONTROLLER AND CONTROL METHOD FOR WASTEGATE

BACKGROUND

The present disclosure relates to a controller and a control method for a wastegate. The wastegate is provided in a bypass passage that allows exhaust gas to bypass the turbine wheel of an exhaust turbine-type forced-induction device.

As described in Japanese Laid-Open Patent Publication No. 2015-214935, some of the controllers for wastegates of exhaust turbine-type forced-induction devices control a boost pressure of the engine by performing feedback control in which the operation position of the wastegate detected by a sensor is a control amount and the drive force of the wastegate is an operation amount.

The feedback control of the operation position produces detection errors in the sensor that detects the operation position and errors resulting from machining tolerances of the wastegate or components of the actuator. In particular, in a high-boost region, slight differences in the operation position of the wastegate cause the boost pressure to vary to a large extent. This makes it difficult to ensure the control accuracy of the boost pressure in the feedback control of the operation position.

Thus, in some cases, the conventional controller is unable to properly control the operation of the exhaust turbine-type forced-induction device depending on the running state of the engine.

SUMMARY

It is an object of the present disclosure to provide a controller and a control method for a wastegate that properly control the operation of an exhaust turbine-type forced-induction device.

Examples of the present disclosure will now be described.

Example 1 is a controller for a wastegate. The wastegate is provided in an exhaust bypass passage that allows exhaust gas to bypass a turbine wheel of an exhaust turbine-type forced-induction device. The controller includes a position control mode and a drive force control mode as modes for controlling the wastegate and is configured to set a target operation position and control an operation position of the wastegate in accordance with the target operation position in the position control mode and to set a target drive force and control a drive force of the wastegate in accordance with the target drive force in the drive force control mode.

In the high-boost region, the running state of the exhaust turbine-type forced-induction device, for example, the boost pressure greatly changes in response to a slight change in the operation position of the wastegate. This requires fine adjustment of the operation position of the wastegate. In the position control mode, there is a limit of the detection accuracy of a sensor that detects the operation position and a limit of the control accuracy of the operation position resulting from machining tolerances of the wastegate or components of the actuator. In the high-boost region, the operation position changes to a small extent in response to a change in the drive force. Thus, controlling the drive force allows for fine adjustment of the operation position of the wastegate. Accordingly, in the high-boost region, the operation of the exhaust turbine-type forced-induction device can be controlled more properly by controlling the wastegate in the drive force control mode than in the position control mode.

In the low-boost region and the natural aspiration region, the operation position of the wastegate affects the operation of the exhaust turbine-type forced-induction device in a limited manner. Thus, even if the wastegate is controlled in the position control mode, the operation of the exhaust turbine-type forced-induction device can be sufficiently controlled. However, in the low-boost region and the natural aspiration region, the differential pressure of exhaust gas acting on the wastegate is small, and the operation position changes greatly in response to a slight change in the drive force. This makes it difficult to adjust the operation position of the wastegate in the drive force control mode. Accordingly, in the low-boost region and the natural aspiration region, the operation of the exhaust turbine-type forced-induction device can be controlled more properly by controlling the wastegate in the position control mode than in the drive force control mode.

The controller for the wastegate of example 1 is configured to control the wastegate in the position control mode when a boost pressure of an engine is less than or equal to a preset value and control the wastegate in the drive force control mode when the boost pressure is greater than the preset value. This allows the controller for the wastegate to properly control the operation of the exhaust turbine-type forced-induction device.

To start the engine, it is desired that the operation position of the wastegate be set to an operation position suitable for ensuring the startability of the engine and running the engine in the natural aspiration region after the engine is started. However, when the wastegate is driven immediately before the engine is started, the operation sound resulting from the driving of the wastegate may be annoying to the driver. In example 2, the controller of example 1 is configured to set the operation position of the wastegate to a target operation position for starting the engine in the position control mode when stopping the engine and keep driving of the wastegate stopped thereafter until the engine is restarted. In such a case, even if the wastegate is not driven immediately before starting the engine, which is when the operation sound may be annoying to the driver, the operation position of the wastegate when the engine is started can be set to the target operation position for starting the engine.

In example 3, the engine to which the controller of example 1 or 2 is applied may have a multi-bank structure in which a plurality of cylinders are arranged separately in a plurality of banks, and the exhaust turbine-type forced-induction device may be one of a plurality of exhaust turbine-type forced-induction devices, which are respectively provided in the banks of the engine. In such an engine, when variation occurs in the operation positions of the wastegates of each bank, differences in the back pressure may vary the internal EGR amount and the amount of residual gas in the cylinders so that the combustion can deteriorate. When the control mode is switched between the position control mode and the drive control mode in accordance with the boost pressure as described above to control the wastegates of each bank, variation in the operation positions in the wastegates between the banks, which causes the deterioration of combustion, is limited.

Example 4 is embodied as a method for controlling the wastegate that executes the processes described in example 1 to 3.

Example 5 is embodied as a non-transitory computer-readable storage medium that stores a program causing a processor to execute the processes described in example 1 to 3.

Other aspects and advantages of the present disclosure will become apparent from the following description, taken in conjunction with the accompanying drawings, illustrating by way of example the principles of the present disclosure.

BRIEF DESCRIPTION OF THE DRAWINGS

The present disclosure, together with objects and advantages thereof, may best be understood by reference to the following description of the presently preferred embodiments together with the accompanying drawings in which.

DETAILED DESCRIPTION

A controller for a wastegate according to one embodiment will now be described with reference to FIGS. 1 to 4.

First, the structure of an intake and exhaust system of the engine 10 to which the controller for a wastegate of the present embodiment is applied will be described with reference to FIG. 1. The white arrows in FIG. 1 represent the direction in which intake air flows in the intake system of the engine 10, and the black arrows represent the direction in which exhaust gas flows in the exhaust system of the engine 10.

Figure 1:
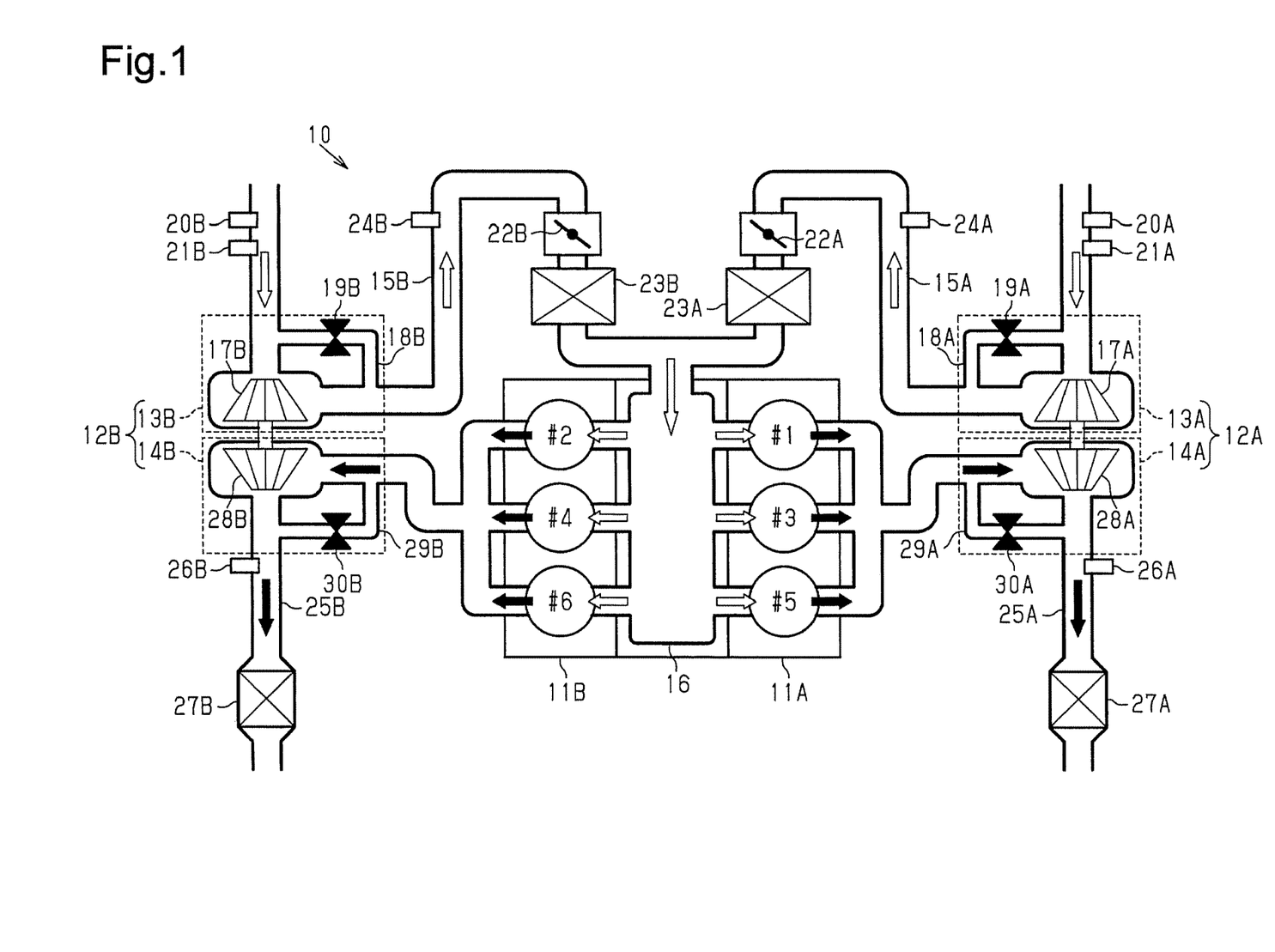
FIG. 1 is a schematic diagram showing the structure of an intake and exhaust system of the engine provided with a wastegate, which is a subject controlled by a controller for a wastegate of one embodiment.

As shown in FIG. 1, the controller for the wastegate of the present embodiment is applied to the engine 10, which is a V6 engine. In the engine 10, six cylinders #1 to #6 are arranged separately in two banks, namely, a first bank 11A and a second bank 11B. The cylinders of the engine 10 are fired in the order of the cylinder #1, the cylinder #2, the cylinder #3, the cylinder #4, the cylinder #5, and the cylinder #6. Three cylinders, namely, the cylinders #1, #3, and #5, are arranged in the first bank 11A, and three cylinders, namely, the cylinders #2, #4, and #6, are arranged in the second bank 11B, respectively.

The engine 10 includes two exhaust turbine-type forced-induction devices 12A and 12B, which are respectively arranged for the first bank 11A and the second bank 11B. The exhaust turbine-type forced-induction devices 12A and 12B respectively include compressors 13A and 13B, which compress intake air, and turbines 14A and 14B, which receive exhaust gas to drive the compressors 13A and 13B.

The engine 10 includes a first intake passage 15A and a second intake passage 15B. The first intake passage 15A is provided with the compressor 13A of the exhaust turbine-type forced-induction device 12A for the first bank 11A, and the second intake passage 15B is provided with the compressor 13B of the exhaust turbine-type forced-induction device 12B for the second bank 11B. The first intake passage 15A and the second intake passage 15B merge with each other to be connected to a surge tank 16 so that intake air is supplied and distributed from the surge tank 16 to each of the cylinders #1 to #6.

The compressors 13A and 13B respectively include compressor wheels 17A and 17B, which compress intake air when the compressor wheels 17A and 17B rotate. Further, the compressors 13A and 13B respectively include intake bypass passages 18A and 18B, which bypass the compressor wheels 17A and 17B for intake air to flow in the intake bypass passages 18A and 18B, and air bypass valves 19A and 19B, which respectively open and close the intake bypass passage 18A and 18B.

Air flow meters 20A and 20B and atmospheric pressure sensors 21A and 21B are respectively provided upstream of the compressors 13A and 13B in the first intake passage 15A and the second intake passage 15B. The air flow meters 20A and 20B detect the flow rate of intake air flowing through the first intake passage 15A and the second intake passage 15B. The atmospheric pressure sensors 21A and 21B detect atmospheric pressure. Further, throttle valves 22A and 22B and intercoolers 23A and 23B are respectively provided downstream of the compressors 13A and 13B in the first intake passage 15A and the second intake passage 15B. The throttle valves 22A and 22B adjust the flow rate of intake air. The intercoolers 23A and 23B cool intake air. Additionally, boost pressure sensors 24A and 24B, which detect boost pressure PB, are respectively provided downstream of the compressors 13A and 13B and upstream of the throttle valves 22A and 22B in the first intake passage 15A and the second intake passage 15B. In the following description, the value of the boost pressure PB is represented by the absolute value of the pressure of intake air flowing in sections downstream of the compressors 13A and 13B and upstream of the throttle valves 22A and 22B.

Additionally, the engine 10 includes a first exhaust passage 25A, through which exhaust gas of each of the cylinders #1, #3, and #5 of the first bank 11A flows, and a second exhaust passage 25B, through which exhaust gas of each of the cylinders #2, #4, and #6 of the second bank 11B flows. The first exhaust passage 25A is provided with the turbine 14A of the exhaust turbine-type forced-induction device 12A for the first bank 11A, and the second exhaust passage 25B is provided with the turbine 14B of the exhaust turbine-type forced-induction device 12B for the second bank 11B. Air-fuel ratio sensors 26A and 26B, which detect the air-fuel ratio of an air-fuel mixture burned in each of the cylinders #1 to #6, are respectively provided downstream of the turbines 14A and 14B in the first exhaust passage 25A and the second exhaust passage 25B. In addition, catalytic devices 27A and 27B, which purify exhaust gas, are respectively provided downstream of the air-fuel ratio sensors 26A and 26B in the first exhaust passage 25A and the second exhaust passage 25B.

The turbines 14A and 14B respectively include turbine wheels 28A and 28B, which rotate when receiving exhaust gas that passes through the turbine wheels 28A and 28B. In the exhaust turbine-type forced-induction devices 12A and 12B, the turbine wheels 28A and 28B are respectively coupled to the compressor wheels 17A and 17B so that they are integrally rotatable. Rotation of the turbine wheels 28A and 28B rotates the compressor wheels 17A and 17B to drive the compressors 13A and 13B. In addition, the turbines 14A and 14B respectively include exhaust bypass passages 29A and 29B and wastegates 30A and 30B. The exhaust bypass passages 29A and 29B allow exhaust gas to bypass the turbine wheels 28A and 28B. The wastegates 30A and 30B respectively open and close the exhaust bypass passages 29A and 29B.

Figure 2:
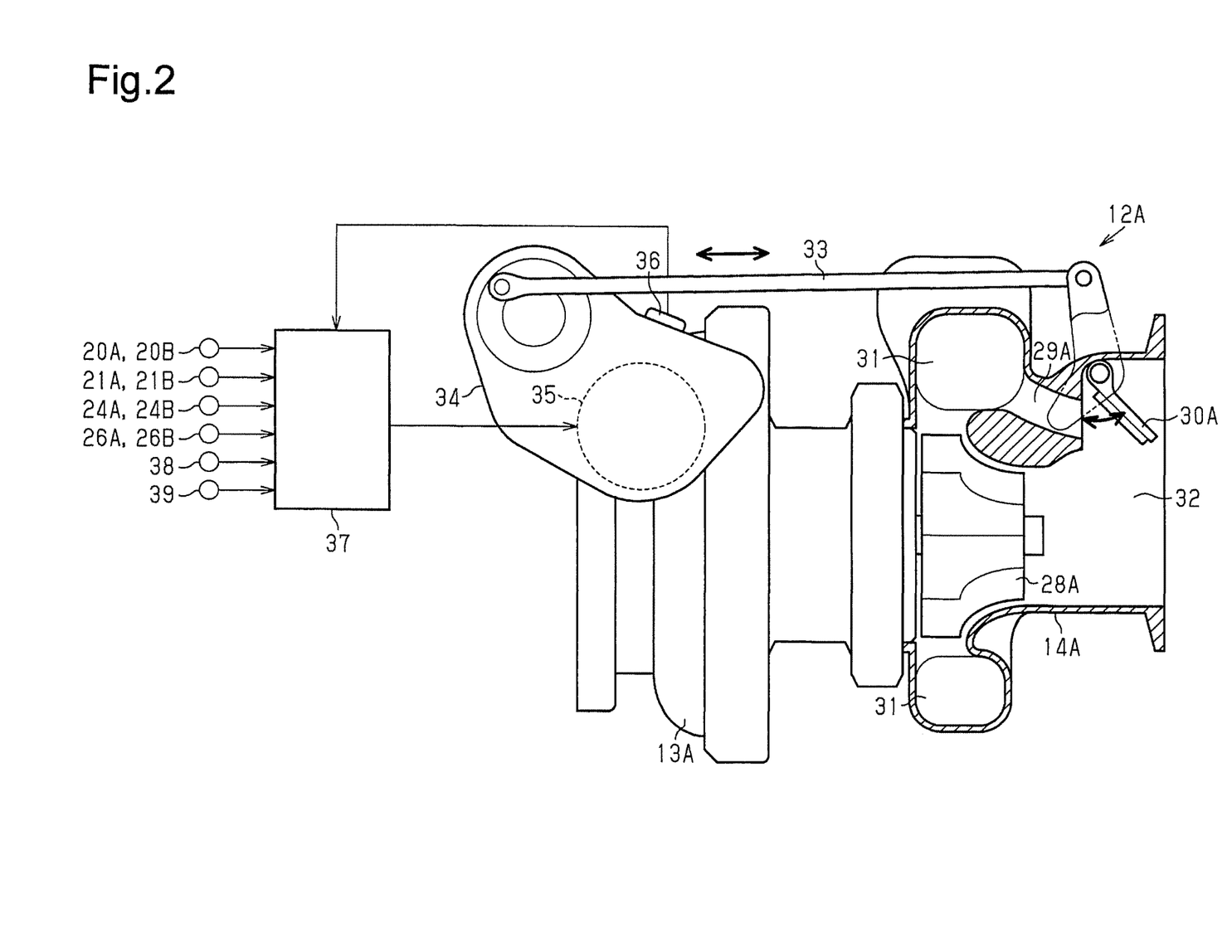
FIG. 2 is a schematic diagram showing the cross-sectional structure of an exhaust turbine-type forced-induction device for the engine shown in FIG. 1.

FIG. 2 shows the partial, cross-sectional structure of the exhaust turbine-type forced-induction device 12A for the first bank 11A. The exhaust turbine-type forced-induction device 12B for the second bank 11B has the same structure as the exhaust turbine-type forced-induction device 12A for the first bank 11A.

The turbine 14A (14B) of the exhaust turbine-type forced-induction device 12A (12B) includes a scroll passage 31, which circles around the outer side of the turbine wheel 28A (28B) in the radial direction, and an exhaust flow outlet 32, out of which exhaust gas is emitted. Further, the turbine 14A (14B) includes the exhaust bypass passage 29A (29B) to allow direct communication between the scroll passage 31 and the exhaust flow outlet 32. The wastegate 30A (30B) is provided on the opening of the exhaust bypass passage 29A (29B) in the exhaust flow outlet 32.

The wastegate 30A (30B) is attached to the turbine 14A (14B) operably in a direction away from the opening of the exhaust bypass passage 29A (29B) at the side of the exhaust flow outlet 32 (hereinafter referred to as opening direction) and in a direction toward the opening (hereinafter referred to as closing direction). The wastegate 30A (30B) operates in a range from a fully-closed position, at which the opening is closed, to a fully-open position, at which further driving of the wastegate 30A (30B) in the opening direction is restricted by a contact with a stopper (not shown).

An actuator 34 is coupled to the wastegate 30A (30B) by a rod 33. The actuator 34 incorporates a direct-current motor 35. Power generated by the direct-current motor 35 in accordance with energization is transmitted through the rod 33 to the wastegate 30A (30B) so that a drive force is applied to the wastegate 30A (30B). The drive force has a magnitude corresponding to current flowing through the direct-current motor 35, i.e., corresponding to a drive current of the actuator 34. In addition, the actuator 34 includes an operation position sensor 36 that detects an operation position VA of the wastegate 30A (30B).

The present embodiment includes a controller 37 configured as a microcomputer for engine control. The controller 37 performs drive control of the wastegate 30A (30B) as an intake air control of the engine 10. Detection results of the air flow meters 20A and 20B, the atmospheric pressure sensors 21A and 21B, the boost pressure sensors 24A and 24B, the air-fuel ratio sensors 26A and 26B, and the operation position sensor 36 are input to the controller 37. Further, detection results of a vehicle sensor 38, which detects the travelling speed of the vehicle equipped with the engine 10, i.e., a vehicle speed SPD, an accelerator position sensor 39, which detects the depression amount of the accelerator pedal by the driver of the vehicle, i.e., an acceleration position ACCP, and the like are input to the controller 37.

Figure 3:
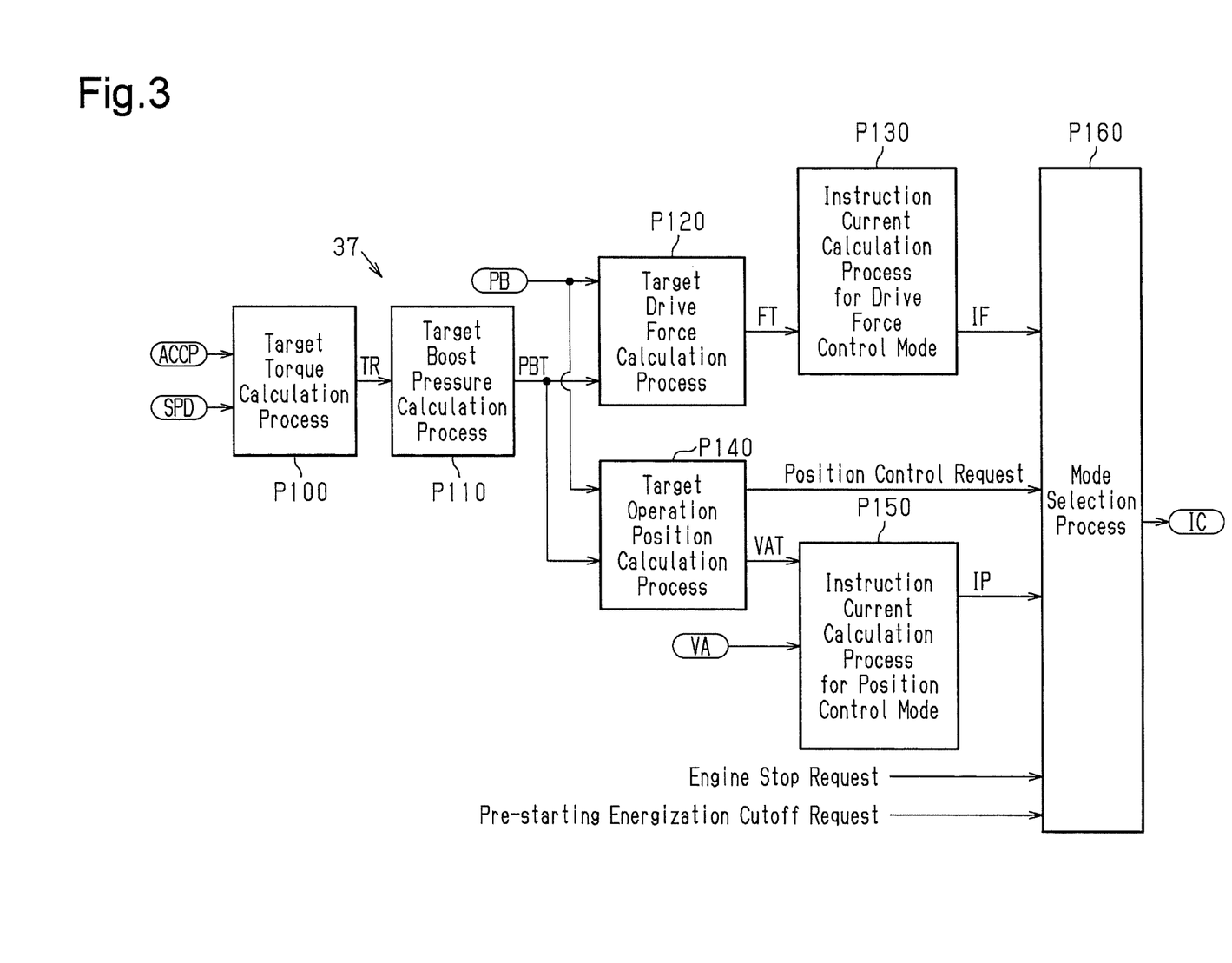
FIG. 3 is a block diagram showing the control configuration of controlling the wastegate in the engine shown in FIG. 1.

FIG. 3 shows the control configuration of the controller 37 in the drive control of the wastegates 30A and 30B. When performing the drive control of the wastegates 30A and 30B, in a target torque calculation process P100, the controller 37 first calculates a target torque TR, which is a target value of engine torque, based on the acceleration position ACCP, the vehicle speed SPD, and the like. Then, in the target boost pressure calculation process P110, the controller 37 calculates, as a value of a target boost pressure PBT, the boost pressure PB, which is necessary to generate the engine torque corresponding to the target torque. In a natural aspiration region, a standard atmospheric pressure (1013.25 [hPa]) is assigned to a value of the target boost pressure PBT.

Further, in a target drive force calculation process P120, the controller 37 calculates a value of a target drive force FT, which is a target value of the drive force of the wastegates 30A and 30B, based on the target boost pressure PBT and the boost pressure PB. Then, in an instruction current calculation process P130 for a drive force control mode, the controller 37 calculates, as a value of an instruction current IF for the drive force control mode, a drive current of the direct-current motor 35 necessary to generate the drive force corresponding to the target drive force FT based on the target drive force FT.

In the target drive force calculation process P120, the target drive force FT is calculated in the following manner. In the present embodiment, the target drive force FT is calculated using the average value of detection values of the two boost pressure sensors 24A and 24B as values of the boost pressure PB. To calculate the target drive force FT, a feedforward term of the target drive force FT is obtained from the target boost pressure PBT by referring to a calculation map that stores the relationship of the target boost pressure PBT obtained in advance through experiments or the like and the drive force of the wastegates 30A and 30B, which is necessary to achieve the target boost pressure PBT. Subsequently, a feedback term of the target drive force FT is obtained from the difference between the target boost pressure PBT and the boost pressure PB, and the sum obtained by adding the feedback term to the feedforward term is calculated as a value of the target drive force FT.

In the target drive force calculation process P120, the drive force of the wastegates 30A and 30B necessary to achieve the target boost pressure PBT is calculated as a value of the target drive force FT. Further, to calculate the target drive force FT in the target drive force calculation process P120, the feedback term is used to perform feedback adjustment of the target drive force FT depending on the difference of the boost pressure PB from the target boost pressure PBT.

In the target operation position calculation process P140, the controller 37 calculates a value of a target operation position VAT, which is a target value of the operation position VA of each of the wastegates 30A and 30B, based on the target boost pressure PBT and the boost pressure PB. The operation position VA of each of the wastegates 30A and 30B necessary to achieve the target boost pressure PBT is set to the value of the target operation position VAT when the target boost pressure PBT is a positive value, i.e., in a boost region. An intermediate operation position, which is located on the closing side of the fully-open position of the wastegates 30A and 30B and on the opening side of the fully-closed position of the wastegates 30A and 30B, is set to the value of the target operation position VAT when the value of the target boost pressure PBT is the standard atmospheric pressure, i.e., in the natural aspiration region. Further, in the target operation position calculation process P140, the controller 37 outputs a position control request when the value of the boost pressure PB is less than or equal to the atmospheric pressure, i.e., when the engine 10 is run in the natural aspiration region.

In an instruction current calculation process P150 for a position control mode, the controller 37 calculates a value of an instruction current IP for the position control mode based on the target operation position VAT and the operation position VA, which is detected by the operation position sensor 36. In the instruction current calculation process P150, feedback adjustment is performed on the value of the instruction current IP in order to reduce the difference of the operation position VA from the target operation position VAT.

Subsequently, in a mode selection process P160, the controller 37 calculates a final instruction current IC, which is an instruction value of the drive current that actually flows through the direct-current motor 35. The final instruction current IC in the mode selection process P160 is calculated based on an engine stop request and a pre-starting energization cutoff request in addition to the instruction current IF for the drive control mode, the instruction current IP for the position control mode, and the position control request.

The controller 37 outputs the engine stop request during a period from when the running stop conditions for the engine 10 are satisfied to when the engine 10 stops running. Further, the controller 37 outputs the pre-starting energization cutoff request during a period from when the engine 10 stops running to when the engine 10 is restarted. The running stop of the engine 10 includes running stop of the engine 10 performed by an idle reduction control when the vehicle is stopped and running stop of the engine 10 when a hybrid vehicle is travelling in the EV mode.

Figure 4:
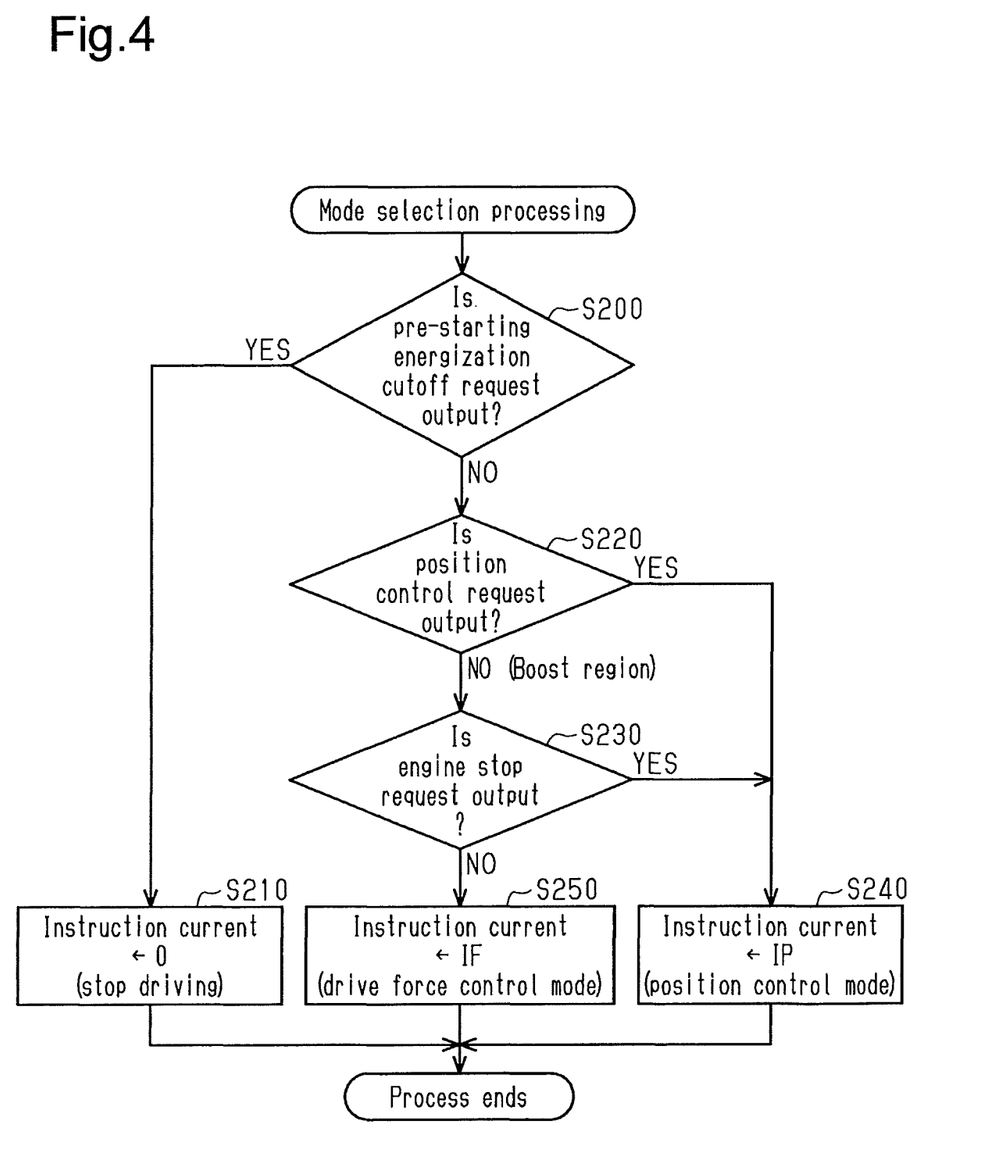
FIG. 4 is a flowchart showing a mode selection processing routine executed by the controller in the engine shown in FIG. 1.

FIG. 4 shows a flowchart of a mode selection processing routine executed by the controller 37 in the mode selection process P160. The controller 37 repeatedly executes the process of the mode selection processing routine at preset control intervals.

When the process of the mode selection processing routine is started, it is first determined in step S200 whether or not the pre-starting energization cutoff request is output. If the pre-starting energization cutoff request is output (S200: YES), the process proceeds to step S210. If the pre-starting energization cutoff request is not output (S200: NO), the process proceeds to step S220.

If the process proceeds to step S210, in step S210, after 0 is assigned to a value of the final instruction current IC, the process of the current mode selection processing routine is ended. That is, in this case, the energization of the direct-current motor 35 is stopped to stop driving the wastegates 30A and 30B.

If the process proceeds to step S220, in step S220, it is determined whether or not the position control request is output, i.e., whether or not the boost pressure PB is less than or equal to the standard atmospheric pressure. If the position control request is output (S220: YES), the process proceeds to step S240. If the position control request is not output (S220: NO), the process proceeds to step S230.

If the process proceeds to step S230, in step S230, it is determined whether or not the engine stop request is output. If the engine stop request is output (S230: YES), the process proceeds to step S240. If the engine stop request is not output (S230: NO), the process proceeds to step S250.

If the process proceeds to step S240 (S220: YES or S230: YES), in step S240, after the instruction current IP for the position control mode is assigned to a value of the final instruction current IC, the current mode selection processing routine is ended. If the process proceeds to step S250 (S220: NO and S230: NO), in step S250, after the instruction current IF for the drive force control mode is assigned to a value of the final instruction current IC, the current mode selection processing routine is ended.

The operation and advantages of the present embodiment will now be described.

When the operation positions of the wastegates 30A and 30B are set to the fully-closed positions in the natural aspiration region, where boosting is not performed, the pressure loss of exhaust gas increases when passing through the turbines 14A and 14B. This increases the pumping loss of the engine 10. When the operation positions VA of the wastegates 30A and 30B are set to the fully-open positions, the pressure loss is minimized in the turbines 14A and 14B. With regard to the transition from the natural aspiration region to the boost region, the operation positions of the wastegates 30A and 30B need to be set to the fully-closed positions because the boost pressure quickly increases. Thus, when the operation positions VA of the wastegates 30A and 30B in the natural aspiration region are set to the fully-open positions, it takes time to change the operation positions of the wastegates 30A and 30B to the fully-closed positions during the transition to the boost region. This delays the increase in the boost pressure. Accordingly, it is desired that the operation positions VA of the wastegates 30A and 30B in the natural aspiration region be proximate to the fully-closed positions as long as the pumping loss remains tolerable. Such desired operation positions of the wastegates 30A and 30B in the natural aspiration region are the intermediate operation positions located on the closing side of the fully-open position and located on the opening side of the fully-closed position.

When the boost pressure PB is less than or equal to the standard atmospheric pressure, i.e., when the engine 10 is run in the natural aspiration region, the controller 37 controls the wastegates 30A and 30B in order to keep the operation positions VA at the intermediate operation positions. When the boost pressure PB is greater than the standard atmospheric pressure, i.e., when the engine 10 is run in the boost region, the controller 37 controls the wastegates 30A and 30B in order to control the boost pressure PB to a pressure that is necessary to achieve the target torque TR.

To control the wastegates 30A and 30B in such a manner, the controller 37 calculates the final instruction current IC, which is an instruction value of a drive current of the direct-current motor 35. The value of the final instruction current IC while the engine 10 is running except when stopped and when started is assigned to the value of the instruction current IP for the position control mode when the position control request is output and to the instruction current IF for the drive force control mode when the position control request is not output. The position control request is output when the value of the target boost pressure PBT is assigned to the standard atmospheric pressure, i.e., when the boost pressure PB is less than or equal to the standard atmospheric pressure.

The value of the instruction current IP for the position control mode is assigned to the drive current of the direct-current motor 35 necessary to set the operation positions VA of the wastegates 30A and 30B to the target operation positions VAT. Further, the value of the instruction current IF for the drive force control mode is assigned to the drive current of the direct-current motor 35 necessary to generate the drive force corresponding to the target drive force FT.

More specifically, in the present embodiment, when the boost pressure PB is less than or equal to the preset value (standard atmospheric pressure), the target operation positions VAT are set, and the wastegates 30A and 30B are controlled in the position control mode for controlling the operation positions VA of the wastegates 30A and 30B in accordance with the target operation position VAT. Further, when the boost pressure PB is greater than the preset value (standard atmospheric pressure), the target drive force FT is set, and the wastegates 30A and 30B are controlled in the drive force control mode for controlling the drive force (instruction current IC) of the wastegates 30A and 30B in accordance with the target drive force FT.

In the turbines 14A and 14B of the engine 10 when running, the pressure loss of exhaust gas that occurs when passing through the turbine wheels 28A and 28B causes differential pressure between the scroll passage 31 and the exhaust flow outlet 32. The differential pressure in exhaust gas between the scroll passage 31 and the exhaust flow outlet 32 generates force acting in the opening direction applied to the wastegates 30A and 30B, which are provided in the exhaust bypass passage 29A and 29B that allow communication between the scroll passage 31 and the exhaust flow outlet 32. The differential pressure between the scroll passage 31 and the exhaust flow outlet 32 decreases as the operation positions VA of the wastegates 30A and 30B change in the opening direction and increases as the operation positions VA change in the closing direction. Thus, the operation positions VA of the wastegates 30A and 30B are fixed to where the force in the opening direction applied by the differential pressure balances with the drive force in the closing direction applied by the actuator 34.

Ensuring the control accuracy of the boost pressure PB in the boost region requires fine adjustment of the operation positions VA of the wastegates 30A and 30B. In the position control mode, errors occur because of the detection accuracy of the operation position sensor 36 and the machining tolerance of the components such as the wastegates 30A and 30B, the rod 33, and the actuator 34. Thus, there is a limit of the control accuracy of the operation position VA. In the boost region, where the back pressure of the engine 10 is high, the operation position VA changes to a small extent in response to the change of the drive force. Thus, controlling the drive force allows for fine adjustment of the operation positions VA of the wastegates 30A and 30B. Accordingly, the control accuracy of the boost pressure PB further improves when the control of the wastegates 30A and 30B is performed in the drive force control mode than in the position control mode. In the present embodiment, when the boost pressure PB is greater than the standard atmospheric pressure, i.e., when the control of the wastegates 30A and 30B is performed to control the boost pressure in the boost region, the wastegates 30A and 30B are controlled in the drive force control mode.

In the natural aspiration region, the differential pressure of exhaust gas acting on the wastegates 30A and 30B is small, and the operation position VA changes greatly in response to a slight change in the drive force. This makes it difficult to adjust the operation positions VA of the wastegates 30A and 30B in the drive force control mode. Further, fine adjustment of the operation position VA comparable to the control of the boost pressure PB is not required for the control of the wastegates 30A and 30B to keep the operation position VA at the intermediate operation position in the natural aspiration region. Thus, the position control mode can adequately satisfy the position control request. In the present embodiment, when the boost pressure PB is less than or equal to the standard atmospheric pressure, i.e., when the control of the wastegates 30A and 30B is performed to keep the intermediate operation position at the natural aspiration region, the wastegates 30A and 30B are controlled in the position control mode.

The engine 10 immediately after it is started is run in the natural aspiration region. Thus, it is desired that the operation positions VA of the wastegates 30A and 30B when the engine has been started be located on the intermediate operation positions. When the wastegates 30A and 30B are driven to the intermediate operation positions immediately before the engine 10 is started, the operation noise of the actuator 34, which is usually drowned out by the operation sound of the engine 10 and is thus not recognized, will be heard. This may be annoying to the driver.

In the present embodiment, when stopping the engine 10, the operation positions VA of the wastegates 30A and 30B are controlled to the intermediate operation positions in the position control mode. Subsequently, the driving of the wastegates 30A and 30B is stopped until the engine 10 is restarted. This prevents the driver from feeling annoyed by the operation sound generated by the actuator 34 when the engine 10 is at a standstill or immediately before the engine 10 is started.

During the period in which the engine 10 is at a standstill, vibration transmitted from outside may result in infinitesimal changes of the operation positions VA of the wastegates 30A and 30B. When the operation positions VA are set to the fully-open positions or the fully-closed positions during the stopped period of the engine 10, the infinitesimal change of the operation positions VA resulting from vibration may cause the wastegates 30A and 30B to repeatedly separate from and strike the outer edge of the opening of the exhaust bypass passage 29A (29B) and the stopper so that noise is produced. In the present embodiment, since the operation positions VA of the wastegates 30A and 30B are set to the intermediate operation positions during the stopped period of the engine 10, the generation of noise caused by the strike is limited.

As described above, in the engine 10, to which the controller 37 of the present embodiment is applied, the first bank 11A and the second bank 11B are separately provided with the exhaust turbine-type forced-induction devices 12A and 12B, respectively. In the engine 10, when variation occurs in the operation positions VA of the wastegates 30A and 30B between the exhaust turbine-type forced-induction devices 12A and 12B of the two banks, differences between the banks in the back pressure may vary the internal EGR amount and the amount of residual gas in the cylinders so that the combustion can deteriorate. In the controller 37 of the present embodiment, switching the control mode allows for highly accurate control of the operation position VA either in the boost region or in the natural aspiration region. This limits variation in the operation positions VA in the wastegates 30A and 30B between the banks, which causes the deterioration of combustion.

The present embodiment may be modified as follows. The present embodiment and the following modifications can be combined as long as the combined modifications remain technically consistent with each other.

In some cases, the operation positions VA of the wastegates 30A and 30B that are desired for obtaining the startability of the engine 10 differ from the operation positions VA of the wastegates 30A and 30B that are desired for running the engine 10 in a natural aspiration mode. In such cases, operation positions that differ when requesting the engine 10 to stop and when running the engine 10 in the natural aspiration region may be assigned to the target operation positions VAT in the position control mode. That is, when requesting the engine 10 to stop, the operation position VA suitable for starting the engine 10 as the target operation position for starting the engine 10 may be set to control the wastegates 30A and 30B in the position control mode.

The target operation position VAT in the natural aspiration region may be variable depending on the running state of the engine 10.

The boost regions include a low-boost region, in which the differential pressure acting on the wastegates 30A and 30B is smaller and a change of the operation position VA in response to the change of the drive force is larger than in the high-boost region. Thus, in some cases, in the low-boost region, the operation positions VA can be adjusted more precisely by controlling the wastegates 30A and 30B in the position control mode than in the drive force control mode. In such cases, the wastegates 30A and 30B may be controlled in the position control mode to control the boost pressure PB in the low-boost region. In such cases, the control of the wastegates 30A and 30B in the position control mode in the low-boost region is performed by setting the target operation position VAT to the operation position VA necessary to achieve the target boost pressure PBT. Thus, the wastegates 30A and 30B are controlled in the position control mode when the boost pressure PB is less than or equal to a preset pressure higher than the standard atmospheric pressure, i.e., in the low-boost region and the natural aspiration region, and the wastegates 30A and 30B are controlled in the drive force control mode when the boost pressure PB is greater than the preset pressure, i.e., in the high-boost region.

When stopping the engine 10, feedback control of the operation positions VA of the wastegates 30A and 30B to the intermediate operation positions is performed in the position control mode. When the operation noise of the actuator 34 is small and is thus not annoying to the driver immediately before the engine 10 is started, the feedback control of the operation positions VA of the wastegates 30A and 30B to the intermediate operation positions in the position control mode may be performed immediately before the engine 10 is started or while the engine 10 is running.

In the above embodiment, the two wastegates 30A and 30B, which are respectively arranged for the first bank 11A and the second bank 11B, are controlled. The control of the wastegates in the embodiment may be applied to the control of a single wastegate or three or more wastegates in the same manner.

The controller can be configured by a device that includes a CPU and a ROM and executes software processing, but is not limited to this configuration. For example, at least part of the processes executed by the software in the above-described embodiment may be executed by hardware circuits dedicated to executing these processes (such as ASIC). That is, the controller may be modified as long as it has any one of the following configurations (a) to (c). (a) A configuration including a processor that executes all of the above-described processes according to programs and a program storage device such as a ROM (including a non-transitory computer readable medium) that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one of a set of one or more software processing circuits and a set of one or more dedicated hardware circuits.

The invention claimed is:

1. A controller for a wastegate, the wastegate being provided in an exhaust bypass passage that allows exhaust gas to bypass a turbine wheel of an exhaust turbine-type forced-induction device, wherein
the controller comprises a position control mode and a drive force control mode as modes for controlling the wastegate and is configured to set a target operation position and control an operation position of the wastegate in accordance with the target operation position in the position control mode and to set a target drive force and control a drive force of the wastegate in accordance with the target drive force in the drive force control mode,
the controller is configured to control the wastegate in the position control mode when a boost pressure of an engine is less than or equal to a preset value and control the wastegate in the drive force control mode when the boost pressure is greater than the preset value, and
the target operation position in the position control mode is an intermediate operation position between a fully-open position and a fully-closed position of the wastegate when the boost pressure of the engine is less than or equal to atmospheric pressure of the engine.

2. The controller according to claim 1, wherein the controller is configured to
set the operation position of the wastegate when stopping the engine to the intermediate operation position as the target operation position for a subsequent start of the engine in the position control mode, and
keep driving of the wastegate stopped thereafter until the engine is restarted.

3. The controller according to claim 1, wherein
the engine has a multi-bank structure in which a plurality of cylinders are arranged separately in a plurality of banks, and
the exhaust turbine-type forced-induction device is one of a plurality of exhaust turbine-type forced-induction devices, which are respectively provided in the banks of the engine.

4. A method for controlling a wastegate, the wastegate being provided in an exhaust bypass passage that allows exhaust gas to bypass a turbine wheel of an exhaust turbine-type forced-induction device, the method comprises:
setting a target operation position and controlling an operation position of the wastegate in accordance with the target operation position in a position control mode for the wastegate;
setting a target drive force and controlling a drive force of the wastegate in accordance with the target drive force in a drive force control mode for the wastegate;
controlling the wastegate in the position control mode when a boost pressure of an engine is less than or equal to a preset value; and
controlling the wastegate in the drive force control mode when the boost pressure is greater than the preset value,
wherein the target operation position in the position control mode is an intermediate operation position between a fully-open position and a fully-closed position of the wastegate when the boost pressure of the engine is less than or equal to atmospheric pressure of the engine.

5. A non-transitory computer-readable storage medium that stores a program causing a processor to execute a control process for a wastegate, the wastegate being provided in an exhaust bypass passage that allows exhaust gas to bypass a turbine wheel of an exhaust turbine-type forced-induction device, wherein the control process comprises:
setting a target operation position and controlling an operation position of the wastegate in accordance with the target operation position in a position control mode for the wastegate;
setting a target drive force and controlling a drive force of the wastegate in accordance with the target drive force in a drive force control mode for the wastegate;
controlling the wastegate in the position control mode when a boost pressure of an engine is less than or equal to a preset value; and controlling the wastegate in the drive force control mode when the boost pressure is greater than the preset value, wherein the target operation position in the position control mode is an intermediate operation position between a fully-open position and a fully-closed position of the wastegate when the boost pressure of the engine is less than or equal to atmospheric pressure of the engine.

\* \* \* \* \*